(12) United States Patent
Petrovic et al.

(10) Patent No.: US 9,181,862 B2
(45) Date of Patent: Nov. 10, 2015

(54) EXHAUST-GAS RECIRCULATION SYSTEM AND METHOD FOR EXHAUST-GAS RECIRCULATION

(71) Applicant: Ford Global Technologies, LLC, Dearborn, MI (US)

(72) Inventors: Simon Petrovic, Aachen (DE); Laurence Hatfield, Horton Kirby (GB); Christian Winge Vigild, Aldenhoven (DE); Jon Dixon, Maldon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 13/848,642

(22) Filed: Mar. 21, 2013

(65) Prior Publication Data

US 2013/0247567 A1    Sep. 26, 2013

(30) Foreign Application Priority Data

Mar. 21, 2012  (EP) ................................ 12160469

(51) Int. Cl.
*F02B 33/44* (2006.01)
*F02D 23/00* (2006.01)
*G06F 17/00* (2006.01)
(Continued)

(52) U.S. Cl.
CPC ............ *F02B 47/08* (2013.01); *F02D 41/0052* (2013.01); *F02D 41/0007* (2013.01); *F02D 41/1454* (2013.01); *Y02T 10/47* (2013.01)

(58) Field of Classification Search
CPC ............ F02D 41/0007; F02D 41/0072; F02D 41/0077; F02D 21/08; F02D 21/083; F02D 2041/007; F02M 25/0707

USPC ............. 60/605.2, 273; 123/568.11; 701/102, 701/103, 108
See application file for complete search history.

(56) References Cited

U.S. PATENT DOCUMENTS 6,378,515 B1 * 4/2002 Geyer ........................... 123/683
7,031,824 B2 * 4/2006 Gangopadhyay ............. 701/108
(Continued)

FOREIGN PATENT DOCUMENTS

DE    102006041518 A1 *  3/2008
DE    102009055236 A1 *  6/2011
(Continued)

OTHER PUBLICATIONS

English Translation DE 102009055236 A1.*
(Continued)

*Primary Examiner* — Thomas Denion
*Assistant Examiner* — Jessica Kebea
(74) *Attorney, Agent, or Firm* — Julia Voutyras; Alleman Hall McCoy Russell & Tuttle LLP

(57) ABSTRACT

The present disclosure provides systems and methods for adjusting an exhaust gas recirculation rate to provide accurate air-fuel ratio. The disclosure provides a method for calculating an exhaust-gas recirculation rate based on a measured exhaust-gas lambda and a turbocharger speed. Through the use of the exhaust-gas lambda and the turbocharger speed it is possible to calculate an exhaust-gas recirculation rate while dispensing with the difficult and unreliable determination of the mass air flow for determining an exhaust-gas recirculation rate, thus providing a stable method which further reduces fuel consumption and emissions.

16 Claims, 4 Drawing Sheets

(51) Int. Cl.
   *F02B 47/08*   (2006.01)
   *G06F 19/00*   (2011.01)
   *F02D 41/14*   (2006.01)
   *F02D 41/00*   (2006.01)

(56) References Cited

U.S. PATENT DOCUMENTS

| | | | |
|---|---|---|---|
| 7,089,738 B1 * | 8/2006 | Boewe et al. | 60/605.2 |
| 7,140,360 B2 * | 11/2006 | Wang et al. | 123/698 |
| 7,261,098 B2 | 8/2007 | Vigild et al. | |
| 7,467,614 B2 * | 12/2008 | Stewart et al. | 123/198 F |
| 8,024,106 B2 * | 9/2011 | Graupner et al. | 701/108 |
| 8,621,864 B2 * | 1/2014 | Osburn et al. | 60/605.2 |
| 2006/0241849 A1 * | 10/2006 | Gangopadhyay | 701/108 |
| 2008/0051973 A1 * | 2/2008 | Gangopadhyay et al. | 701/102 |
| 2008/0167791 A1 * | 7/2008 | Fulton et al. | 701/108 |
| 2009/0132153 A1 * | 5/2009 | Shutty et al. | 701/108 |
| 2010/0175674 A1 * | 7/2010 | Vennettilli et al. | 123/703 |
| 2010/0242936 A1 * | 9/2010 | Zurlo et al. | 123/704 |
| 2011/0077838 A1 | 3/2011 | Osburn et al. | |
| 2011/0184700 A1 * | 7/2011 | Michalske et al. | 702/182 |
| 2011/0313634 A1 * | 12/2011 | Yasui et al. | 701/102 |
| 2012/0102943 A1 * | 5/2012 | Petrovic et al. | 60/597 |
| 2012/0125301 A1 * | 5/2012 | Ide et al. | 123/568.21 |
| 2012/0137660 A1 * | 6/2012 | Yan et al. | 60/276 |
| 2012/0197550 A1 * | 8/2012 | Cianflone et al. | 702/45 |
| 2012/0297767 A1 * | 11/2012 | Hofbauer | 60/605.2 |
| 2013/0080034 A1 * | 3/2013 | Chi et al. | 701/108 |
| 2014/0060506 A1 * | 3/2014 | Shaver | 123/672 |
| 2014/0227109 A1 * | 8/2014 | Wang et al. | 417/53 |

FOREIGN PATENT DOCUMENTS

| | | |
|---|---|---|
| DE | 102010035364 A1 | 3/2012 |
| DE | 102012200055 B4 * | 3/2012 |
| GB | 2363210 A | 12/2001 |
| GB | 2423833 A | 9/2006 |
| GB | 2460053 A | 11/2009 |

OTHER PUBLICATIONS

English Translation 102006041518 A1.*
English Translation DE102012200055 B4.*

* cited by examiner

EXHAUST-GAS RECIRCULATION SYSTEM AND METHOD FOR EXHAUST-GAS RECIRCULATION

CROSS REFERENCE TO RELATED APPLICATIONS

The present application claims priority to European Patent Application No. 12160469.8, filed on Mar. 21, 2012, the entire contents of which are hereby incorporated by reference for all purposes.

TECHNICAL FIELD

The disclosure relates to an exhaust-gas recirculation system.

BACKGROUND AND SUMMARY

The disclosure is aimed in particular at an exhaust-gas recirculation system for a turbocharged internal combustion engine of a motor vehicle, an internal combustion engine and a method for exhaust-gas recirculation for a turbocharged internal combustion engine of a motor vehicle.

Exhaust-Gas Recirculation (EGR) serves to minimize nitrogen oxide emissions generated during the combustion. Here, the already burned exhaust-gas is supplied to the fresh-air flow supplied to the engine, and the mixture thereby generated is burned in the engine with a supply of fuel.

Ever more stringent legal requirements demand the reduction of NOx emissions and an improvement of the exhaust-gas recirculation control system. As more EGR is recirculated there is less enthalpy on a turbocharger turbine, and less oxygen in the exhaust-gas resulting in progressively richer air-fuel ratio in the combustion chamber.

Present controllers base EGR rate on the mass air flow (MAF), in which feedforward setpoint values for the exhaust-gas recirculation valve are generated taking into consideration the present operating point of the engine, usually speed and load and/or rated torque. Some model-based adaptations are partially included, in which the theoretical flow area of the exhaust-gas recirculation valve is controlled. This approach however has problems with regard to stability, because a pressure ratio across the valve may be measured or estimated, and because there are adverse effects caused by fluctuations as a result of pumping of the engine, sensitivities around a pressure ratio of one, and by impurities with fine dust or solid bodies.

Furthermore, sensors for the mass air flow are liable to durability problems, which can lead to a large offset in the measurement. Said durability problems occur in particular during long periods of city driving.

A different controller for exhaust-gas recirculation, which has been developed for EURO VI+ applications, uses an oxygen sensor arranged in the intake manifold, also referred to as an FMAN sensor, in order to regulate the oxygen concentration. In this way, it is sought to obtain optimum combustion in the cylinders of the engine. Said method is however expensive and involves a considerable amount of expenditure in the revision of existing oxygen sensors. For example, the stability of the heating circuit and the dynamic characteristics of the pump cells use a continuously varying factor for the pressure correction.

The inventors have recognized the aforementioned disadvantages and disclose herein a system and methods for accurate monitoring and delivery of desired air charge oxygen content. The object of the present disclosure is the accurate control of EGR rate to produce desired air-fuel ratio. This is achieved by monitoring a turbocharger speed and exhaust-gas lambda.

Through the use of the lambda value and the speed or rotational speed of the turbocharger, which are relatively simple to determine, it is possible to dispense with the difficult and unreliable determination of the mass air flow. It is thus possible to provide a stable method which furthermore reduces the fuel consumption of the engine.

The present disclosure provides systems and methods for adjusting an exhaust gas recirculation rate to provide accurate air-fuel ratio. The disclosure provides a method for calculating an exhaust-gas recirculation rate based on a measured exhaust-gas lambda and a turbocharger speed. Through the use of the exhaust-gas lambda and the turbocharger speed it is possible to calculate an exhaust-gas recirculation rate while dispensing with the difficult and unreliable determination of the mass air flow for determining an exhaust-gas recirculation rate, thus providing a stable method which further reduces fuel consumption and emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
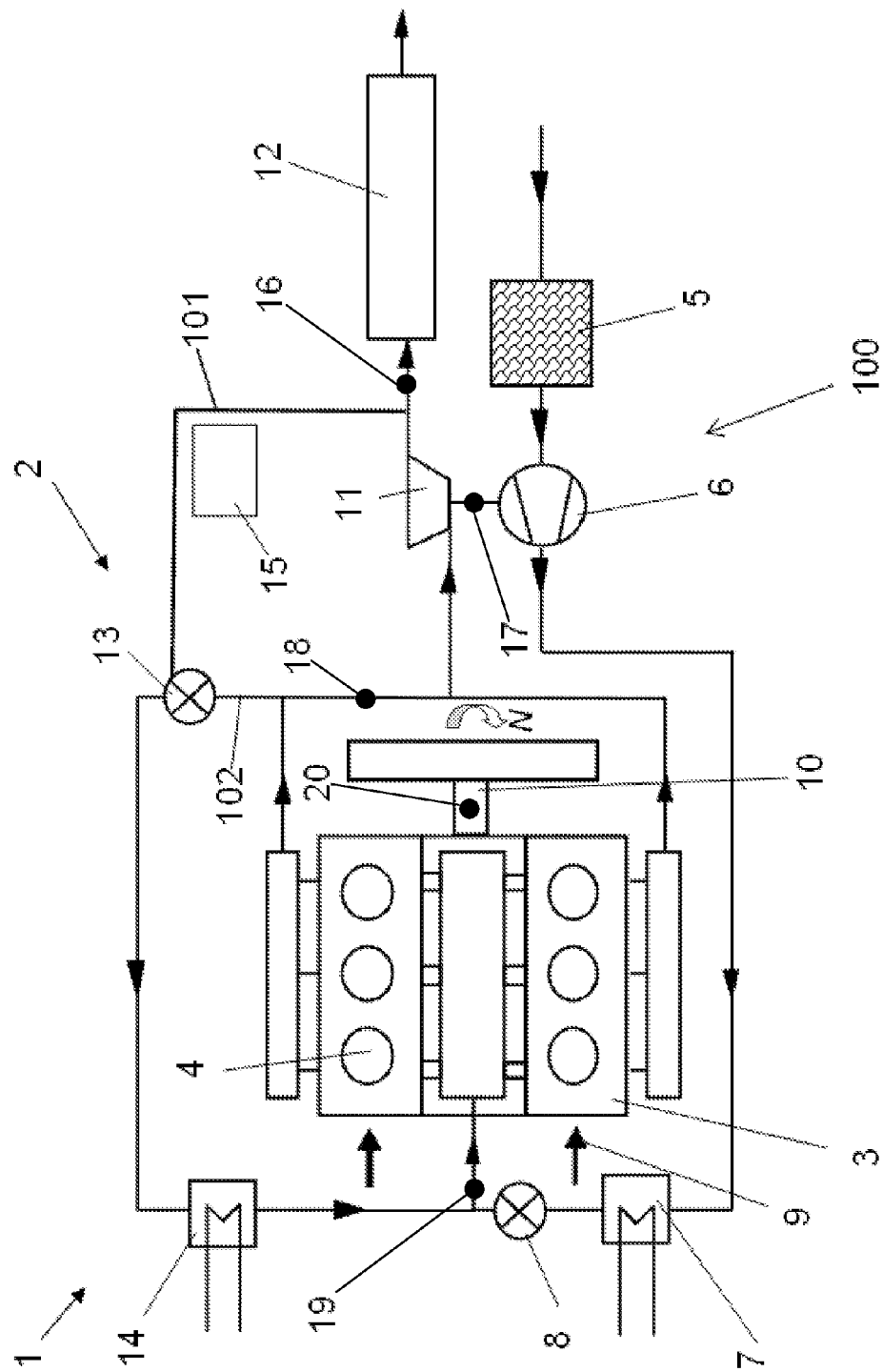
FIG. 1 shows a block circuit diagram of an engine having an exhaust-gas recirculation system according to the disclosure.
Figure 2:
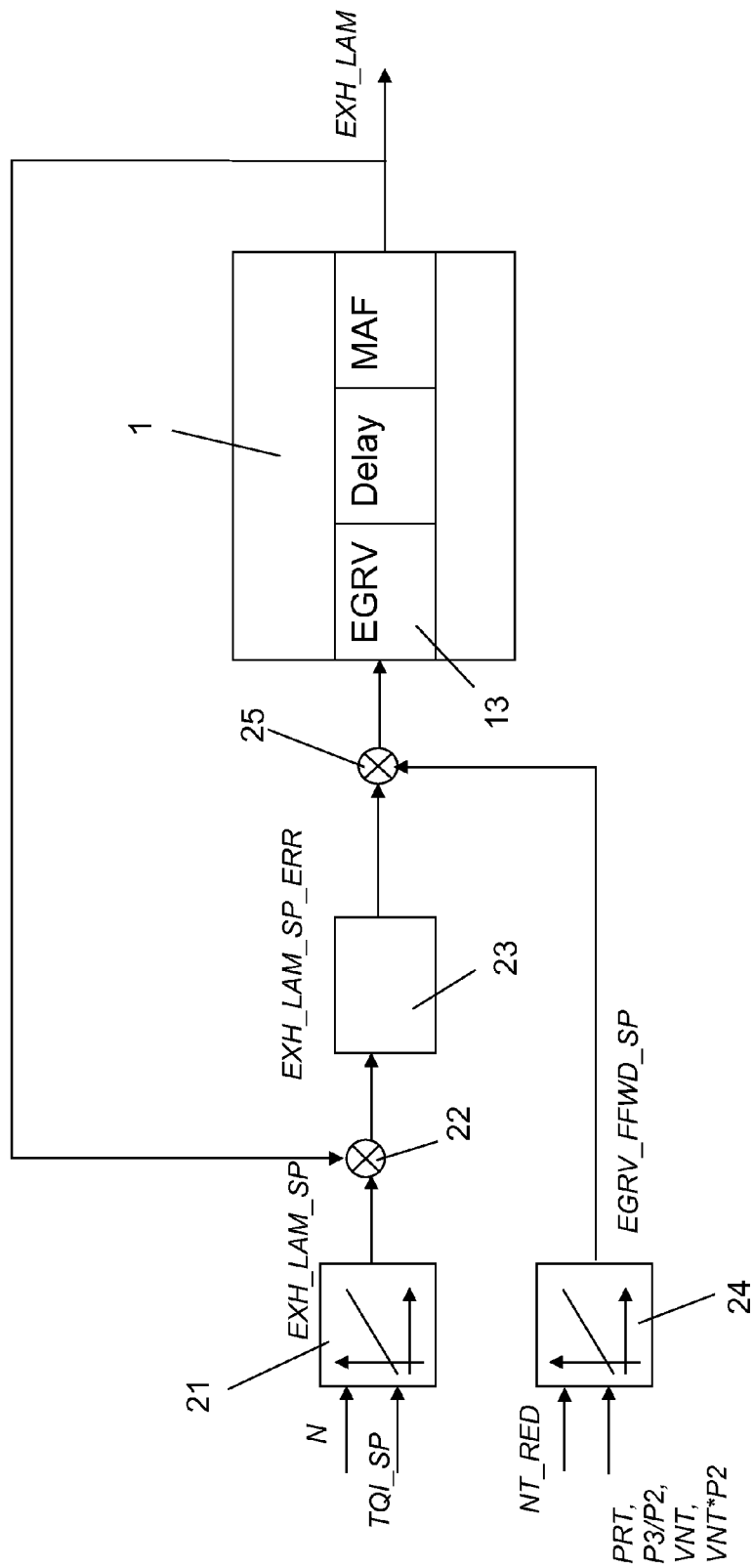
FIG. 2 shows a block circuit diagram of a control system for an exhaust-gas recirculation system according to the disclosure.
Figure 3:
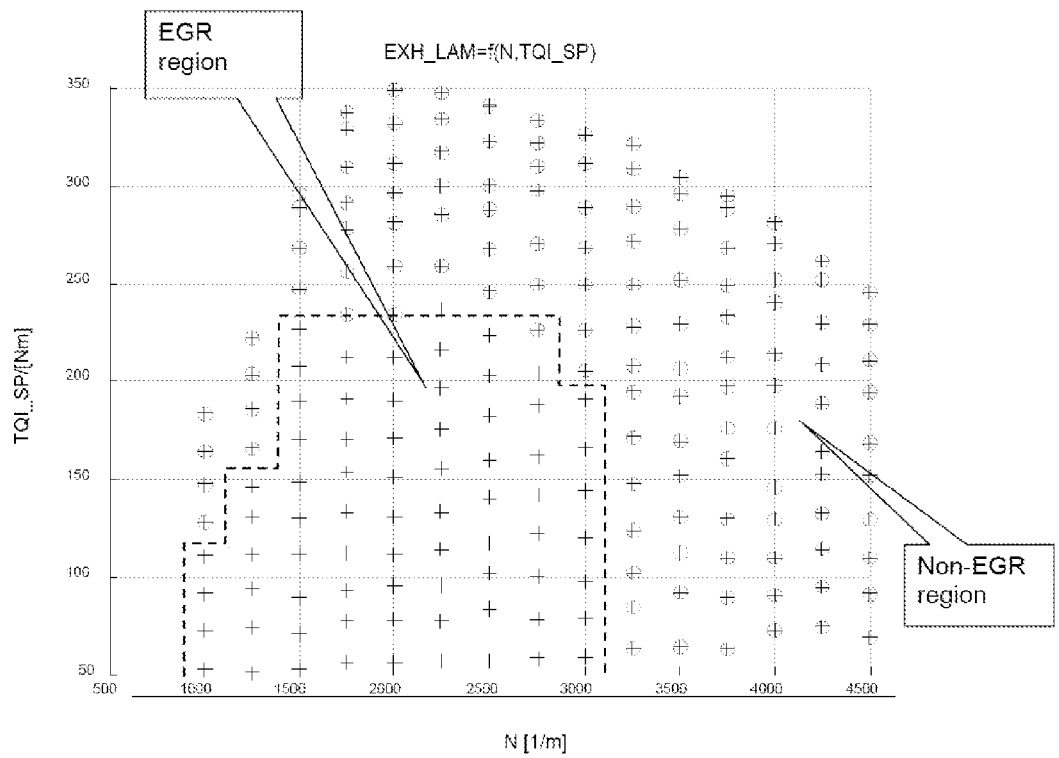
FIG. 3 shows a diagram for the determination of the lambda setpoint value according to the disclosure.
Figure 4:
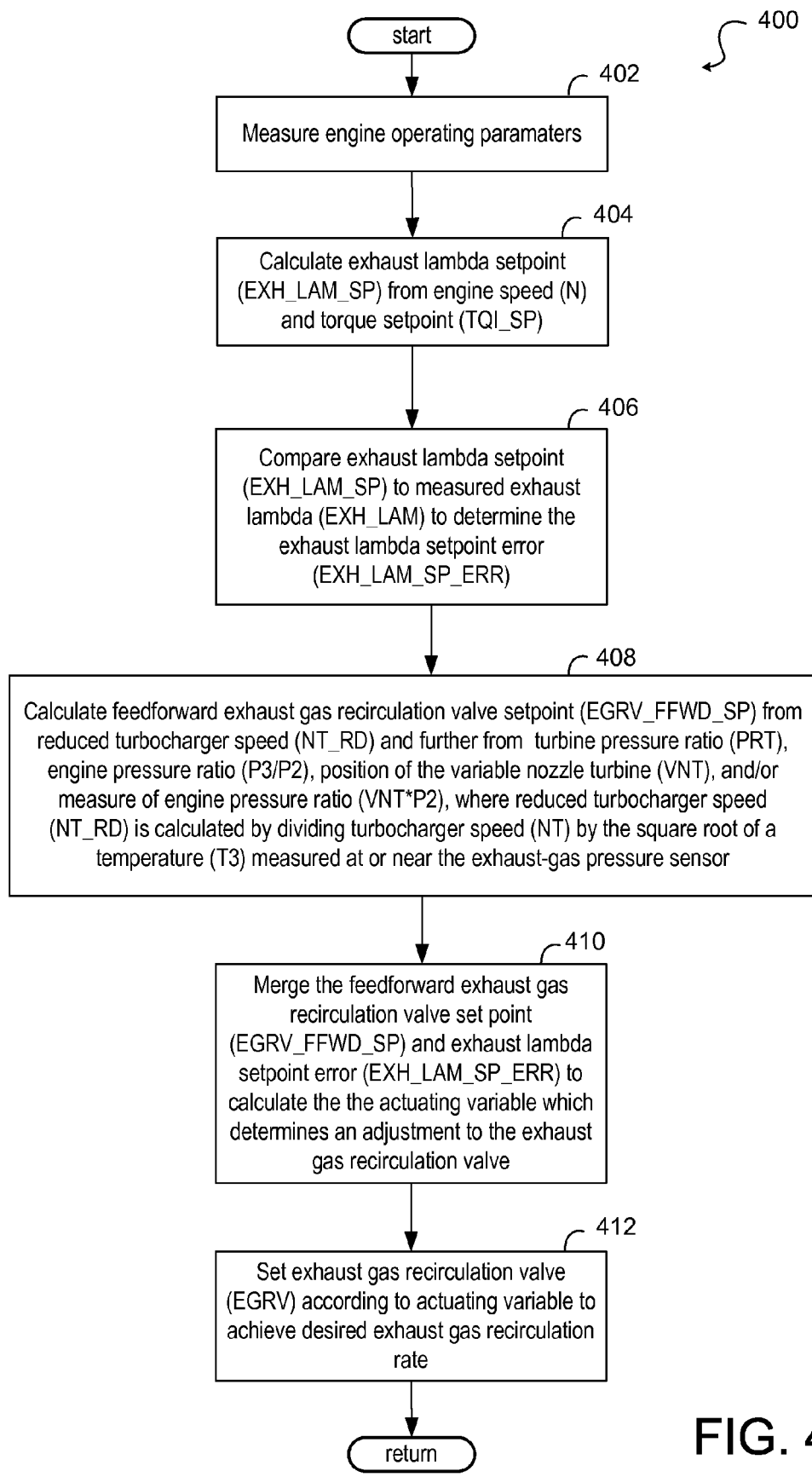
FIG. 4 shows a flowchart of a method for setting an exhaust-gas recirculation rate.

The object of the present disclosure is described in greater detail below in reference to the FIGS. An engine with an exhaust-gas recirculation system in accordance with the present disclosure is shown in FIG. 1. FIG. 2 shows an example control system for operating the engine of FIG. 1 to control air fuel ratio with accurate exhaust-gas recirculation rates. FIG. 3 shows a chart for determining the lambda setpoint value which may be used in the control system of FIG. 2. FIG. 4 shows an example flow chart of a method for accurate control of air-fuel ratio with exhaust-gas recirculation in accordance with the present disclosure.

Turning now to FIG. 1, an internal combustion engine 1 having an exhaust-gas recirculation system 2 is shown. The exhaust-gas recirculation system may comprises a high-pressure 102 exhaust-gas recirculation system with an inlet upstream of the turbocharger and a low-pressure 101 exhaust-gas recirculation with an inlet downstream of the turbocharger. Alternatively, an exhaust-gas recirculation system may comprise one of a high-pressure 102 or low-pressure 101 EGR system and may not comprise both passages.

The internal combustion engine 1 has an engine block 3 with six cylinders 4. Six cylinders are shown in FIG. 1 but it should be appreciated the present disclosure may apply to an engine with any number of cylinders including V-6, I-4, I-6, V-12, opposed 4, and other engine types. Fresh air or supply air is supplied to the cylinders 4, which air firstly passes through an air filter 5 and is subsequently compressed by a turbocharger 100 having a turbine 11 and a compressor 6. A charge-air cooler 7 cools the air, which is heated during the compression, before said air is supplied to the cylinders 4. A throttle function 8 which can be controlled by the user of the motor vehicle determines the amount of supplied air and also the amount of supplied fuel. A fuel injection system 9 is schematically illustrated.

The air/fuel mixture is burned in the cylinders 4, whereby a crankshaft 10 of the engine 1 is set in rotation. The speed or rotational speed of the engine 1, which may for example be measured at a crankshaft 10, is denoted by N. The exhaust-gas generated during the combustion is conducted out of the cylinders and drives an exhaust-gas-side turbine 11 which, in turn, powers compressor 6. An exhaust-gas aftertreatment system 12 is arranged downstream of the turbine 11.

The exhaust-gas recirculation system 2 branches off upstream of the turbocharger 100. The rate of exhaust-gas recirculation is controlled by means of an exhaust-gas recirculation valve 13. Arranged downstream of the exhaust-gas recirculation valve 13 is an exhaust-gas recirculation cooler 14 which cools the hot recirculated exhaust-gas to a temperature suitable for effective mixing with the supplied fresh air. The recirculated exhaust-gas and the supplied fresh air are mixed between the exhaust-gas recirculation cooler 14 and the throttle function 8. Said mixture is then supplied to the cylinders 4.

For the control of the exhaust-gas recirculation system 2 or, more precisely, for the control of the position of the exhaust-gas recirculation valve 13, various sensors are provided, the measurement results or measurement values of which are processed by a controller 15, which then controls the exhaust-gas recirculation valve 13 as a function of the measurement results. The controller may receive input from a manifold absolute pressure sensor, an engine speed sensor and an exhaust-gas pressure sensor.

An exhaust-gas lambda sensor 16, which is arranged downstream of the turbocharger 100, or more precisely downstream of the exhaust-gas-side turbine blade 11 and upstream of the exhaust-gas aftertreatment system 12, measures the lambda value in the exhaust-gas and transmits the measurement result EXH_LAM to the controller 15.

A turbocharger speed sensor 17 measures speed or rotational speed of the turbocharger 100 and transmits the measurement result NT to the controller 15.

An exhaust-gas pressure sensor 18 is arranged upstream of the turbocharger 100, or more precisely upstream of the exhaust-gas-side turbine 11. The exhaust-gas pressure sensor 18 may be arranged in an exhaust manifold. The exhaust-gas pressure sensor 18 measures the pressure of the exhaust-gas and transmits the measurement result P3 to the controller 15.

A charge pressure sensor 19 is arranged upstream of the engine block 3. The charge pressure sensor 19 may be arranged in the intake manifold and may be designed as a so-called TMAP (Temperature and Manifold Absolute Pressure) sensor. The charge pressure sensor 19 measures the charge pressure and transmits the measurement result P2 to the controller 15. For this purpose, the turbocharger speed sensor 17, like the exhaust-gas lambda sensor 16, is connected to the controller 15. For reasons of clarity, the connection between the exhaust-gas lambda sensor 16 and the controller 15 is not illustrated.

An engine speed sensor 20 measures the speed or rotational speed of the engine 1 and transmits the measurement result N to the controller 15. For this purpose, the turbocharger speed sensor 17, like the exhaust-gas lambda sensor 16, is connected to the controller 15. For reasons of clarity, the connection between the sensor 16 and the controller 15 is not illustrated.

According to a first aspect of the disclosure, an exhaust-gas recirculation system for a turbocharged internal combustion engine of a motor vehicle comprises an exhaust-gas lambda sensor arranged downstream of the turbocharger, a speed sensor for measuring the speed of the turbocharger, and an exhaust-gas recirculation valve which can be controlled as a function of measurement results from the exhaust-gas lambda sensor and from the speed sensor. Through the use of the lambda value and the speed or rotational speed of the turbocharger, which are relatively simple to determine, it is possible to dispense with the difficult and unreliable determination of the mass air flow. The disclosure is based on the fact that, with increased exhaust-gas recirculation, the enthalpy at the turbocharger falls and the speed thereof correspondingly drops, and that, with relatively rich exhaust-gas, the oxygen content falls, that is to say the lambda value of the exhaust-gas is influenced. The exhaust-gas recirculation system permits optimized engine operation, which reduces fuel consumption.

The exhaust-gas recirculation system may comprise an exhaust-gas pressure sensor arranged upstream of the turbocharger. Alternatively, the pressure may be estimated. Depending on the application, it may be estimated whether the improvement as a result of the additional sensor pays off. The measurement result is taken into consideration during the control of the exhaust-gas recirculation valve.

A controller may be provided for processing the measurement results and for actuating the exhaust-gas recirculation valve. The controller may adapt values or characteristic curves for example to the respective operating point of the engine. The controller may be integrated in existing controllers such as the engine controller or the exhaust-gas aftertreatment controller, or an individual controller may be provided. By means of the controller, the exhaust-gas recirculation system can easily be adapted to new circumstances of the engine or legal regulations.

According to a second aspect of the disclosure, an internal combustion engine of a motor vehicle comprises a turbocharger and an exhaust-gas recirculation system as described above. The internal combustion engine has the same advantages and modifications as described above for the exhaust-gas recirculation system.

Turning now to FIG. 2, a mode of operation of the exhaust-gas recirculation system 2, or of the controller 15, will now be explained in more detail. A lambda setpoint value EXH_LAM_SP is generated in a first block 21. For this purpose, the speed N of the engine 1 and a rated torque setpoint value TQI_SP are taken into consideration as input variables. The lambda setpoint value EXH_LAM_SP may be determined by means of the diagram illustrated in FIG. 3 described in greater detail below.

In a comparator 22 or similar block, the measured exhaust-gas lambda value EXH_LAM is compared with the lambda setpoint value EXH_LAM_SP calculated in block 21. As a result, a regulating error or a lambda setpoint value error EXH_LAM_SP_ERR is output, which is prepared and processed in a control block 23.

A feedforward exhaust-gas recirculation valve setpoint value EGRV_FFWD_SP is generated in a block 24. For this purpose, a reduced speed of the turbocharger 100 NT_RED is used as an input variable. The reduced speed is calculated from the speed NT divided by the square root of a temperature T3 measured at or near the exhaust-gas pressure sensor 18. The exhaust-gas pressure sensor 18 may be a combined sensor which measures pressure and temperatures. The turbine pressure ratio PRT (P3/pressure at the lambda sensor 16), the engine pressure ratio P3/P2, a position of the variable turbine geometry VNT (Variable Nozzle Turbine) and/or a value for the engine pressure ratio measure VNT*P2 are/is supplied as further input variable(s) to the block 24.

In a comparator 25 or similar block, the lambda setpoint value error EXH_LAM_SP_ERR and the feedforward exhaust-gas recirculation valve setpoint value EGRV_FFWD_SP are merged. Said merged value is the actuating variable which determines an exhaust-gas recirculation rate for which the exhaust-gas regulating valve 13 is set. After a delay, the change of the exhaust-gas regulating valve 13 has an effect on the lambda value in the exhaust-gas. The measurement of the lambda value EXH_LAM is then fed back to the comparator 22.

The regulating arrangement shown in FIG. 3, with a closed regulating loop for EXH_LAM and feedforward regulation for EGRV_FFWD_SP, is implemented in the controller 15. The individual blocks may also be realized in different decentralized controllers. In FIG. 3, the engine speed N and the torque setpoint TQI_SP are plotted against one another. For the lambda value in the exhaust-gas, various regions are plotted which differ in terms of the magnitude of the lambda value. Furthermore, the diagram is divided into an exhaust-gas recirculation region (EGR region) and a region in which no exhaust-gas recirculation takes place (Non-EGR region). The lambda setpoint value EXH_LAM_SP is determined by means of the diagram as a function of the respective rotational speed of the engine N and the respective torque setpoint value TQI_SP.

Turning now to FIG. 4, a flowchart of a method 400 to control the exhaust-gas recirculation rate for accurate air-fuel ratio is shown. In step 402 engine operating parameters are measured. These may include engine speed (N), turbocharger speed (NT), exhaust lambda (EXH_LAM), position of variable nozzle turbine (VNT), boost pressure (P2), exhaust manifold pressure (P3), etc. The method proceeds to step 404 where the exhaust lambda setpoint (EX_LAM_SP) is calculated by engine controller 15. The value is based on engine speed (N) and torque setpoint (TQI_SP), and based on a map such as that shown in FIG. 3 which may be stored in the engine controller.

Next, at step 406, the exhaust lambda setpoint (EXH_LAM_SP) is compared to the measured exhaust lambda (EXH_LAM) as provided by exhaust lambda sensor 16. The comparison produces the exhaust-gas lambda setpoint error (EXH_LAM_SP_ERR). The exhaust-gas lambda (EXH_LAM) may be compared following a delay after an alteration to the exhaust-gas lambda setpoint (EXH_LAM_SP) as shown and described with reference to FIG. 2.

At step 408, the feedforward exhaust-gas recirculation valve set point (EGRV_FFWD_SP) is calculated from the turbine pressure ratio (PRT), engine pressure ratio (P3/P2), position of the variable nozzle turbine (VNT), and measure of the engine pressure ratio (VNT*P2).

At 410, the above calculated feedforward exhaust-gas recirculation valve setpoint (EGRV_FFWD_SP) and the exhaust-gas lambda setpoint error (EXH_LAM_SP_ERR) are merged to calculate the actuating variable which determines an adjustment to the exhaust-gas recirculation valve such that a desired exhaust-gas recirculation rate may be achieved.

At 412, the actuating variable is applied to set the exhaust-gas recirculation valve. The method then returns, in this way the exhaust-gas lambda setpoint is constantly checked against the measured exhaust-gas lambda and adjusted such that the exhaust-gas lambda setpoint may be maintained.

A torque setpoint value can be taken into consideration during the generation of the exhaust-gas lambda setpoint value. As a result of the additional processing of the torque setpoint value, the method is more precise and robust.

A turbine pressure ratio, an engine pressure ratio, an engine pressure ratio measure and/or a position of the variable turbine geometry may be taken into consideration during the generation of the feedforward exhaust-gas recirculation valve setpoint value. As a result of the additional processing of one or more of the additional values, a parameterization of the feedforward exhaust-gas recirculation valve setpoint value takes place, which makes the method more precise and robust.

A delay from the exhaust-gas recirculation valve to the exhaust-gas lambda value measured downstream may be taken into consideration. The position of the exhaust-gas recirculation valve has a delayed effect on the exhaust-gas lambda value measured downstream. The transport delay is dependent on the installed engine and on whether the system is a high-pressure system, or a cleaner low-pressure system, or may include both.

Temperature and/or pressure corrections may be carried out during the generation of the lambda setpoint value and/or of the feedforward exhaust-gas recirculation valve setpoint value. The stability of the method can be increased in this way.

The present disclosure provides systems and methods for adjusting an exhaust gas recirculation rate to provide accurate air-fuel ratio. The disclosure provides a method for calculating an exhaust-gas recirculation rate based on a measured exhaust-gas lambda and a turbocharger speed. Through the use of the exhaust-gas lambda and the turbocharger speed it is possible to calculate an exhaust-gas recirculation rate while dispensing with the difficult and unreliable determination of the mass air flow for determining an exhaust-gas recirculation rate, thus providing a stable method which further reduces fuel consumption and emissions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust-gas recirculation system comprising:
a turbocharger;
an exhaust-gas lambda sensor arranged downstream of the turbocharger;
a turbocharger speed sensor for measuring a speed of the turbocharger; and
a non-transitory controller configured to:
calculate a reduced turbocharger speed based on the measured speed of the turbocharger, calculate an exhaust lambda setpoint, and calculate a feedforward exhaust-gas recirculation valve setpoint as a function of the reduced turbocharger speed and one or more of a turbine pressure ratio, an engine pressure ratio, a position of a variable nozzle turbine, and an engine pressure ratio measure,
determine an exhaust lambda setpoint error by comparing the exhaust lambda setpoint to an exhaust lambda measured by the exhaust-gas lambda sensor, and
actuate an exhaust-gas recirculation valve as a function of the exhaust lambda setpoint error and the feedforward exhaust-gas recirculation valve setpoint.

2. The exhaust-gas recirculation system as claimed in claim 1, further comprising an exhaust-gas pressure sensor arranged upstream of the turbocharger.

3. A method, comprising:
measuring engine operating parameters including an exhaust-gas lambda downstream of a turbocharger, an engine speed, a turbocharger speed, and a temperature upstream of a turbine of the turbocharger;
with a non-transitory controller,
generating an exhaust-gas lambda setpoint dependent on the measured engine speed;
generating an exhaust-gas lambda setpoint error from the measured exhaust-gas lambda and the exhaust-gas lambda setpoint;
calculating a feedforward exhaust-gas recirculation valve setpoint dependent on the measured turbocharger speed and temperature upstream of the turbine; and
controlling an exhaust-gas recirculation valve responsive to the exhaust-gas lambda setpoint error and the feedforward exhaust-gas recirculation valve setpoint.

4. The method as claimed in claim 3, wherein generating the exhaust-gas lambda setpoint is further dependent on a torque setpoint.

5. The method as claimed in claim 3, wherein calculating the feedforward exhaust-gas recirculation valve setpoint is further dependent on a turbine pressure ratio, an engine pressure ratio, an engine pressure ratio measure and a position of a variable geometry turbine of the turbocharger.

6. The method as claimed in claim 3, wherein generating the exhaust-gas lambda setpoint error further comprises measuring the exhaust-gas lambda downstream of the turbocharger after a delay following setting of the exhaust-gas recirculation valve.

7. The method as claimed in claim 3, wherein generating the exhaust-gas lambda setpoint and the feedforward exhaust-gas recirculation valve setpoint further comprises carrying out temperature and pressure corrections.

8. A method, comprising:
with a non-transitory controller,
calculating a feedforward exhaust-gas recirculation valve setpoint as a function of a reduced turbocharger speed and one or more of a turbine pressure ratio, an engine pressure ratio, a position of a variable nozzle turbine, and an engine pressure ratio measure;
calculating an exhaust-gas lambda setpoint error by comparing a measured exhaust-gas lambda downstream of a turbocharger turbine with an exhaust-gas lambda setpoint;
adjusting an exhaust-gas recirculation valve based on a comparison of the exhaust-gas lambda setpoint error and the feedforward exhaust-gas recirculation valve setpoint.

9. The method of claim 8, further comprising receiving input from a manifold absolute pressure sensor, an engine speed sensor and an exhaust-gas pressure sensor.

10. The method of claim 9, wherein the manifold absolute pressure sensor senses a temperature and manifold absolute pressure.

11. The method of claim 8, further comprising, with the controller, calculating the exhaust-gas lambda setpoint based on a measured engine speed and a torque setpoint.

12. The method of claim 11, wherein calculating the exhaust-gas lambda setpoint is further based on a stored torque setpoint and engine speed diagram.

13. The method of claim 11, wherein calculating the exhaust-gas lambda setpoint further comprises carrying out temperature and pressure corrections.

14. The method of claim 8, wherein calculating the feedforward exhaust-gas recirculation valve setpoint further comprises carrying out temperature and pressure corrections.

15. The method of claim 8, wherein comparing the measured exhaust-gas lambda to the exhaust-gas lambda setpoint further comprises measuring the exhaust-gas lambda after a delay following setting of the exhaust-gas recirculation valve.

16. The method of claim 8, wherein the reduced turbocharger speed is a measured turbocharger speed divided by the square root of a temperature measured at or near an exhaust-gas pressure sensor.

* * * * *